United States Patent
Garrison et al.

(10) Patent No.: US 8,820,752 B2
(45) Date of Patent: Sep. 2, 2014

(54) INTERSHAFT SEAL WITH CENTRIFUGAL COMPENSATION

(71) Applicant: Stein Seal Company, Kulpsville, PA (US)

(72) Inventors: Glenn M. Garrison, Perkiomenville, PA (US); Thurai Manik Vasagar, Hatfield, PA (US)

(73) Assignee: Stein Seal Company, Kulpsville, PA (US)

( * ) Notice: Subject to any disclaimer, the term of this patent is extended or adjusted under 35 U.S.C. 154(b) by 0 days.

(21) Appl. No.: 13/898,402

(22) Filed: May 20, 2013

(65) Prior Publication Data

US 2013/0251523 A1    Sep. 26, 2013

Related U.S. Application Data

(63) Continuation-in-part of application No. PCT/US2012/057699, filed on Sep. 28, 2012, which is a continuation-in-part of application No. 13/527,122, filed on Jun. 19, 2012, which is a continuation-in-part of application No. 12/210,246, filed on Sep. 15, 2008, now Pat. No. 8,205,891.

(51) Int. Cl.

| F16J 15/02 | (2006.01) |
| F01D 11/00 | (2006.01) |
| F16J 15/32 | (2006.01) |
| F16J 15/44 | (2006.01) |
| F02C 7/28 | (2006.01) |
| F16J 15/16 | (2006.01) |

(52) U.S. Cl.
CPC ............... *F02C 7/28* (2013.01); *F01D 11/003* (2013.01); *F16J 15/3244* (2013.01); *F16J 15/445* (2013.01); *F16J 15/164* (2013.01); *F05D 2250/75* (2013.01); *F16J 15/441* (2013.01); *F05D 2260/38* (2013.01); *F16J 15/442* (2013.01)
USPC .......................................... 277/585; 277/579

(58) Field of Classification Search
USPC ............ 277/305, 579, 585, 580, 581; 415/69, 415/170.1, 173.3, 174.2, 230, 231, 216.1; 416/128–129, 174
See application file for complete search history.

(56) References Cited

U.S. PATENT DOCUMENTS

| 2,646,999 A | 7/1953 | Barske |
| 4,082,296 A | 4/1978 | Stein |

(Continued)

FOREIGN PATENT DOCUMENTS

| CN | 102348915 A | 2/2012 |
| DE | 29510961 U1 | 9/1995 |

(Continued)

*Primary Examiner* — Gilbert Lee
(74) *Attorney, Agent, or Firm* — Michael Crilly, Esquire

(57) ABSTRACT

A segmented intershaft seal assembly for use between inner and outer shafts within a turbine engine is presented. The intershaft seal assembly includes annular end rings, an annular seal element with an inverted "T"-shaped cross section, at least one resilient element, an annular spacer ring, carriers, counterweights, and hydrodynamic grooves. The intershaft seal assembly is secured to the inner shaft. The resilient element(s) biases seal segments away from the inner shaft toward the outer shaft. The counterweights are disposed about the seal segments and substantially negate forces imposed by the seal segments outward toward the outer shaft. The hydrodynamic grooves are disposed along an inner annular surface of the outer shaft and direct fluid onto an outer surface along the seal segments when the outer shaft rotates. The hydrodynamic grooves form a thin-film layer and non-contact seal that separates the seal segments from the outer shaft which otherwise provide a contact-type seal.

17 Claims, 15 Drawing Sheets

(56) References Cited

U.S. PATENT DOCUMENTS

| | | |
|---|---|---|
| 4,211,424 A | 7/1980 | Stein |
| 4,501,431 A | 2/1985 | Peisker et al. |
| 4,598,913 A | 7/1986 | Kotzur |
| 4,752,077 A * | 6/1988 | Hoffelner .................. 277/367 |
| 4,754,984 A | 7/1988 | Keba |
| 5,039,113 A | 8/1991 | Gardner |
| 6,196,790 B1 | 3/2001 | Sheridan et al. |
| 6,513,812 B1 | 2/2003 | Yang et al. |
| 7,055,826 B2 * | 6/2006 | Stewart, Jr. .................. 277/358 |
| 7,140,109 B2 | 11/2006 | Dourlens et al. |
| 7,320,468 B2 | 1/2008 | Morgan |
| 7,344,357 B2 | 3/2008 | Couture, Jr. et al. |
| 7,726,940 B2 | 6/2010 | Snowsill |
| 8,100,403 B2 | 1/2012 | Short |
| 2002/0140176 A1 | 10/2002 | Tong |
| 2003/0025273 A1 | 2/2003 | Stewart, Jr. |
| 2003/0131602 A1 | 7/2003 | Ingistov |
| 2010/0066027 A1 | 3/2010 | Vasagar |
| 2010/0164180 A1 | 7/2010 | Short |

FOREIGN PATENT DOCUMENTS

| | | |
|---|---|---|
| EP | 0253839 B1 | 1/1988 |
| EP | 0382333 A1 | 8/1990 |
| EP | 0995933 B1 | 4/2000 |
| EP | 2341218 A2 | 7/2011 |
| FR | 2602847 A1 | 2/1988 |
| GB | 15792 A | 0/1910 |
| GB | 1565018 A | 4/1980 |

* cited by examiner

US 8,820,752 B2

INTERSHAFT SEAL WITH CENTRIFUGAL COMPENSATION

CROSS REFERENCE TO RELATED APPLICATIONS

This application is a continuation-in-part of PCT Applicant No. PCT/US2012/057699 filed Sep. 28, 2012 entitled Segmented Intershaft Seal Assembly and also is a continuation of U.S. Non-Provisional application Ser. No. 13/527,122 filed Jun. 19, 2012 entitled Segmented Intershaft Seal Assembly which is a continuation-in-part of U.S. application Ser. No. 12/210,246 filed Sep. 15, 2008 entitled Intershaft Seal Assembly now U.S. Pat. No. 8,205,891, which are hereby incorporated in their entirety by reference thereto.

FEDERALLY SPONSORED RESEARCH AND DEVELOPMENT

None.

BACKGROUND OF THE INVENTION

1. Field of the Invention

The invention generally relates to a sealing device for turbine engines. Specifically, the invention is a segmented intershaft seal with a T-shaped cross section and centrifugal compensation. The segmented intershaft seal is disposed between inner and outer shafts. Each seal segment is biased in an outward radial direction so as to initially contact the outer shaft. Hydrodynamic pockets along the outer shaft form a thin-film layer between the outer shaft and the seal segments when the inner and outer shafts rotate. The centrifugal compensation offsets the outward centrifugal forces acting on the seal segments so as to allow formation of a thin-film layer and separation of the seal segments from the outer shaft.

2. Background

Intershaft seals are often employed between counter-rotating or co-rotating shafts within a turbine engine. Intershaft seals minimize wear and friction induced heat by rotating with one shaft immediately adjacent to and separate from another shaft. As such, intershaft seals are typically referred to as clearance-type seals. In one example, a sealing element could contact and rotate with an inner shaft without contacting the outer shaft. In another example, a sealing element could contact and rotated with an outer shaft without contacting the inner shaft. Seal clearance can be in either radial or axial directions. In both examples, contact induced wear is minimized by limiting interactions between seal and opposing shaft to those caused by heat or thrust induced misalignments.

In some turbine engines, operational parameters could limit fluid flow between inner and outer shafts such that clearance-type seals are inadequate and could also limit wear along the sealing element such that contact-type seals are not practical. In these applications, a hybrid approach is required whereby the sealing element contacts the opposing shaft below a predetermined threshold, typically related to the rotational speed of the shaft(s), and separates from the opposing shaft above the threshold. Below the threshold, the sealing element prevents fluid from flowing between the shafts and minimizes wear along the sealing element. Above the threshold, the sealing element limits flow of fluid between the shafts and avoids wear along the sealing element.

Hydrodynamic pockets are often employed to form a thin-film layer between a sealing element and a shaft so as to separate the sealing element which otherwise contacts the shaft. Unfortunately, the lift force generated by hydrodynamic pockets is limited and not sufficient to overcome the centrifugal forces acting on a sealing element disposed along an inner shaft. One solution is centrifugal compensation to offset, negate, or cancel the outward centrifugal forces acting on the sealing element that otherwise frustrate hydrodynamic sealing.

Stein describes a seal in U.S. Pat. No. 4,211,424, entitled Centrifugal Compensated Seal for Sealing between Concentric Shafts, for sealing between a hollow outer shaft and an inner shaft concentric with the outer shaft having a seal ring with a plurality of segments extending around the inner shaft. The seal ring has an outer circumferential surface confronting the inner surface of the outer shaft, a first side face exposed to a region of high pressure and a second side face confronting a mating ring secured to the inner shaft and having a portion thereof exposed to a region of lower pressure. A segmented compensating ring extends around the inner shaft and spaced from the seal ring in the region of high pressure. A flange secured to the inner shaft limits the axial movement of the compensating ring away from the seal ring. A continuous balancing ring between the seal ring and the compensating ring has a pair of conical faces mating with conical faces on the seal ring and compensating ring, respectively. Hydrodynamic and closed pockets in the bearing surfaces are used to vary the contact forces.

Stein states that his "invention relieves the centrifugal loading with relatively simple means without resorting to a multiplicity of hinged or articulated counterweights or similar complex mechanisms." In doing so, Stein teaches away from solutions including hinged or articulated counterweights without specifically describing such mechanisms.

The complexity of a centrifugal compensation mechanism influences the functionality, assemble-ability, and reliability of a sealing system. Stein infers that hinged or articulated solutions result in functionally deficient, difficult to assembly, and unreliable sealing systems.

Accordingly, what is required is a sealing element including hinged counterweights which is functional, easily assembled, and reliable so as to provide contact and non-contact sealing during operation of a turbine engine.

SUMMARY OF THE INVENTION

An object of the invention is to provide a sealing element including hinged counterweights which is functional, easily assembled, and reliable so as to provide contact and non-contact sealing during operation of a turbine engine.

In accordance with embodiments of the invention, the intershaft seal assembly includes a pair of annular end rings, an annular seal element, at least one resilient element (one non-limiting example being a compression spring), an annular spacer ring, a pair of carriers, a plurality of counterweights and a plurality of hydrodynamic grooves. The annular seal element includes at least two seal segments. Each seal segment has an inverted "T"-shaped cross section. Seal segments are disposed between the annular end rings so that a portion of the inverted "T"-shaped cross section extends above the annular end rings in the direction of an outer shaft. Each seal segment includes a pair of shoulders which extend from the seal segment between the annular end rings and the annular spacer ring. The resilient element(s) biases the seal segments away from an inner shaft toward the outer shaft. The annular spacer ring is disposed about and directly contacts the inner shaft. The annular spacer ring is also disposed between and attached to the annular end rings. The annular seal element is disposed about the annular spacer ring. The carriers are disposed between the annular end rings about the annular seal element. The carriers directly contact the annular spacer ring. The counterweights are oppositely disposed about each seal segment. Each counterweight is attached to one carrier and contacts one shoulder. The counterweights substantially balance forces acting on the seal segment outward toward the outer shaft. The hydrodynamic grooves are disposed along an inner annular surface of the outer shaft and direct fluid onto an outer surface along each seal segment when the outer shaft rotates. The fluid forms a thin-film layer which separates the seal segments from the outer shaft.

In accordance with other embodiments of the invention, each counterweight includes a mass arm and a contact arm oppositely disposed about a flange. The contact arm contacts one shoulder of the seal segment and the mass arm is rotatably responsive to rotation of the inner shaft.

In accordance with other embodiments of the invention, each counterweight includes at least two mass arms and at least two contact arms oppositely disposed about and attached to an arcuate member. The arcuate member directly contacts a socket along one carrier so as to be rotatable within the socket. The contact arms directly contact one seal segment. The mass arms are rotatably responsive to rotation of the inner shaft.

In accordance with other embodiments of the invention, the hydrodynamic grooves are arranged so that at least one hydrodynamic groove communicates fluid onto the outer surface of each seal segment.

In accordance with other embodiments of the invention, the inner annular surface along the outer shaft includes an insert comprised of a wear resistant material. The hydrodynamic grooves are disposed along the wear resistant insert. The outer surface of the seal segments contacts the insert absent the thin-film layer.

In accordance with other embodiments of the invention, the hydrodynamic grooves are disposed along each seal segment to form at least two groups. Each group includes at least two hydrodynamic grooves.

In accordance with other embodiments of the invention, each counterweight directly contacts a spring which biases the contact arm away from the outer shaft.

In accordance with other embodiments of the invention, each counterweight biases the contact arm away from the outer shaft.

In accordance with other embodiments of the invention, each seal shoulder includes at least one notch. One contact arm is disposed within each notch.

In accordance with other embodiments of the invention, one annular end ring includes at least one vent hole adjacent to the low pressure side.

In accordance with other embodiments of the invention, each seal segment includes a groove and a dam disposed along the outer surface. The dam is adjacent to the low pressure side.

The intershaft seal system includes a segmented annular seal ring having an inverted "T" shaped cross section. The annular seal ring is secured to the inner shaft and cooperates with the outer shaft to form a seal. The seal is formed directly along the bore of the outer shaft which includes a plurality of diagonal hydrodynamic grooves. The hydrodynamic grooves could be machined into a hard-coating, examples being tungsten carbide or chromium carbide, along the bore of the outer shaft. Hydrodynamic grooves could include, but are not limited to, groove patterns described in U.S. Pat. Nos. 7,931,277, 7,963,525, and 8,091,898 each entitled Hydrodynamic Circumferential Seal System for Large Translations. Air enters the hydrodynamic grooves on the high pressure side of the seal system and is pulled along each dead ended groove by shaft rotation. The air is pressurized as it traverses the length of each groove and is communicate onto the bore of the outer shaft toward the low pressure side. The hydrodynamic grooves are oriented so that the inlet end of each groove is toward the rotational direction of the outer shaft adjacent to the high pressure section.

The seal segments are composed of a temperature resistant material, one non-limiting example being carbon graphite. The arc length of each segment is design dependent. The segments are arranged end-to-end about a spacer ring and the inner shaft. Abutting ends could be shaped so as to form straight gaps or over-lapping joints, one example of the latter being a tongue and groove arrangement. Over-lapping joints reduce air leakage through the joints. Each seal segment could include an anti-rotation slot that aligns with a tab along a carrier to keep the joint overlaps equivalent. Two sets of equally spaced dowel pins in a spacer ring could engage slots in both carriers and both counter-balance arms to prevent rotation within the seal assembly.

Compression springs under each carbon segment apply a radially outer force. The seal segments contact the inside diameter of the runner or outer shaft at startup and lift off to a small radial clearance, non-limiting examples being 0.0001 to 0.0003-inch, at differential shaft speeds greater a predetermined value. The predetermined value could be the speed at which forces are produced by the hydrodynamic grooves. One specific non-limiting example is a differential linear velocity greater than fifty (50) feet-per-second. The seal system forms an air film when the hydrodynamic grooves generate an air pressure that exceeds the compression springs and differential pressure forces under the seal segments. The shoulders of each seal segment have an initial radial clearance with respect to the mating rings. The seal segments maintain an air film between the shafts so as to limit air leakage.

Each seal segment has slots along the outside diameter of the shoulders to accept arms attached to the counter-balance weights. The radially inward force of the counter-balance arms is preferred to be equivalent to the outward centrifugal force of the seal segments so as to centrifugally balance or negate the outward bias of the seal segments that might otherwise result during rotation of the inner shaft. The result is a seal ring which contacts an outer shaft at lower differential rotational velocities and which is separable from an outer shaft at higher differential rotational velocities. Without the compensation effects of the present invention, the hydrodynamic lift force imposed by hydrodynamic grooves is not sufficient to provide the separation at higher differential rotational velocities because the mass force of the seal ring is greater than the lifting force produced by the grooves.

The intershaft seal and variations thereof described herein facilitate a contact seal at lower rotational velocities and a non-contact seal at higher rotational velocities at the interface between an outer shaft and an inner shaft. The invention is expected to be used within applications wherein a housing forms and separates a higher pressure section from a lower pressure section, and the lower pressure section must be isolated from gases from the higher pressure section by means of a seal system. One specific non-limiting example is a turbine engine.

Several advantages are offered by the invention. The invention minimizes the number of moving parts required to secure the counterweights within a seal assembly, thereby increasing reliability and simplifying assembly. The invention minimizes the elements required for proper functionality of the counterweights within a seal assembly, thereby increasing reliability and simplifying assembly. The invention provides multiple contact points between shoulders along each seal segment and the counterweights which impose a degree of redundancy that ensures functionality of the seal system.

The above and other objectives, features, and advantages of the preferred embodiments of the invention will become apparent from the following description read in connection with the accompanying drawings, in which like reference numerals designate the same or similar elements.

BRIEF DESCRIPTION OF THE INVENTION

Additional aspects, features, and advantages of the invention will be understood and will become more readily apparent when the invention is considered in the light of the following description made in conjunction with the accompanying drawings.

DETAILED DESCRIPTION OF THE INVENTION

Figure 1:
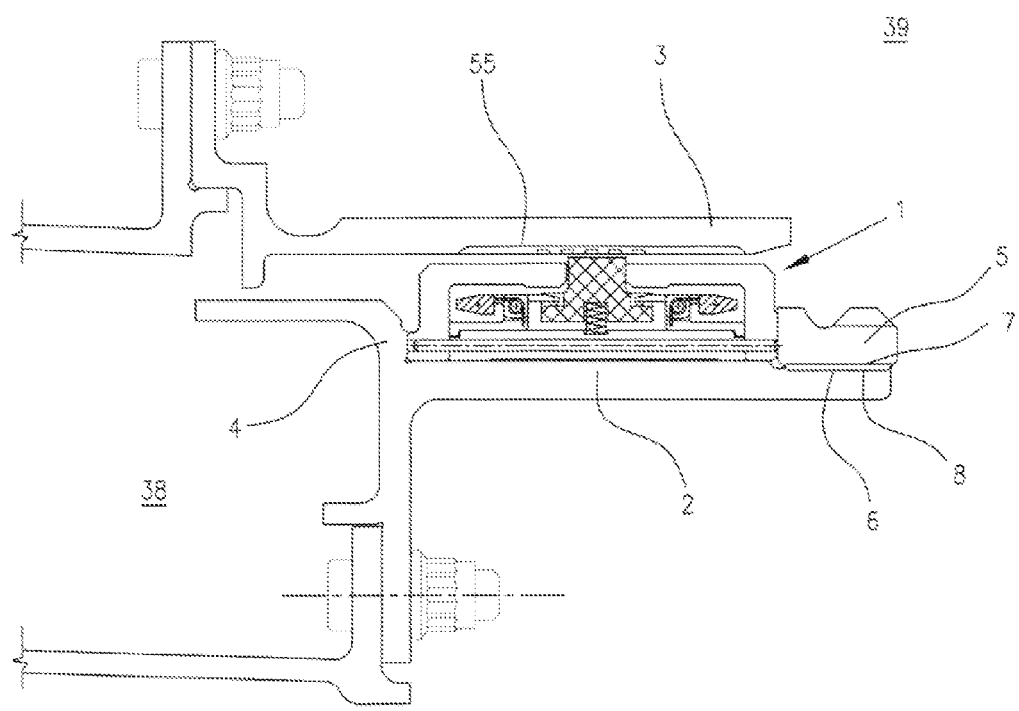
FIG. 1 is a cross-sectional view illustrating a seal assembly disposed between an inner shaft and an outer shaft in accordance with an embodiment of the invention.

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described throughout this document, it is understood that two or more such features could be combined into a single embodiment.

Referring now to FIG. 1, the seal assembly 1 is shown interposed between an inner shaft 2 and an outer shaft 3 within a turbine engine Inner and outer shafts 3 are structures understood in the art which rotate in either a counter-rotational or co-rotational fashion. The inner shaft 2 generally includes a substantially horizontal section attached to other support elements within an engine. The outer shaft 3 also includes a substantially horizontal section attached to other supports elements. The arrangement of support elements are design and application dependent. Therefore, the support elements shown in FIG. 1 are for descriptive purposes only and not intended to limit scope of the invention.

For purposes of the invention, the inner shaft 2 and outer shaft 3 should be concentrically aligned with and separately rotatable about a common rotational axis, often along or adjacent to the centerline of a turbine engine. The seal assembly 1 is interposed between the inner and outer shafts 2, 3. The seal assembly 1 is further interposed between a high pressure side 38 and a low pressure side 39. Location of the seal assembly 1 between inner and outer shafts 2, 3 prevents or at least minimizes flow of hot gases from the high pressure side 38 to the low pressure side 39.

The seal assembly 1 is attached to the inner shaft 2 and rotates therewith. Various attachment means are available to secure the seal assembly 1 to the inner shaft 2. For example, the inner shaft 2 is shown in FIG. 1 including a shoulder 4 at one end and a locking ring 5 at another end. The seal assembly 1 contacts the outer annular surface 6 of the inner shaft 2. One end of the seal assembly 1 abuts the shoulder 4. The locking ring 5 includes an inner annular surface 7. Threads 8 are disposed along the inner annular surface 7 and outer annular surface 6 in a complementary arrangement. The locking ring 5 is secured to the inner shaft 2 via the threads 8. The locking ring 5 contacts the seal assembly 1 thereby applying a compressive force onto the seal assembly 1 in the direction of the shoulder 4. The seal assembly 1 rotates with the inner shaft 2 when the locking ring 5 is properly and completely secured to the inner shaft 2.

Referring now to FIGS. 2, 3, 11, and 12, the seal assembly 1 is shown including a pair of annular end rings 10, 11 disposed about an annular spacer ring 12. Each annular end ring 10, 11 has a generally "L" shaped cross section with a vertical element 73 intersecting and fixed to a horizontal element 74. The annular end rings 10, 11 are arranged about the annular spacer ring 12 so that the inner end of each vertical element 73 contacts one edge of the annular spacer ring 12. The horizontal element 74 along each annular spacer ring 12 is arranged to be substantially parallel to and partially overlap the annular spacer ring 12. Each annular end ring 10, 11 includes a channel 15, 13, respectively. Channels 13, 15 are align with a channel 14 disposed along the length of the annular spacer ring 12. An anti-rotation pin 16 is inserted into the channels 13, 14, 15 so as to secure the annular end rings 10, 11 to the annular spacer ring 12. An interference fit between the anti-rotation pin 16 and channels 13, 15 fastens the annular end rings 10, 11 to the annular spacer ring 12. The inner bore of the vertical elements 73 and annular spacer ring 12 contact the outer diameter of the inner shaft 2, as otherwise represented in FIG. 1.

Figure 7A:
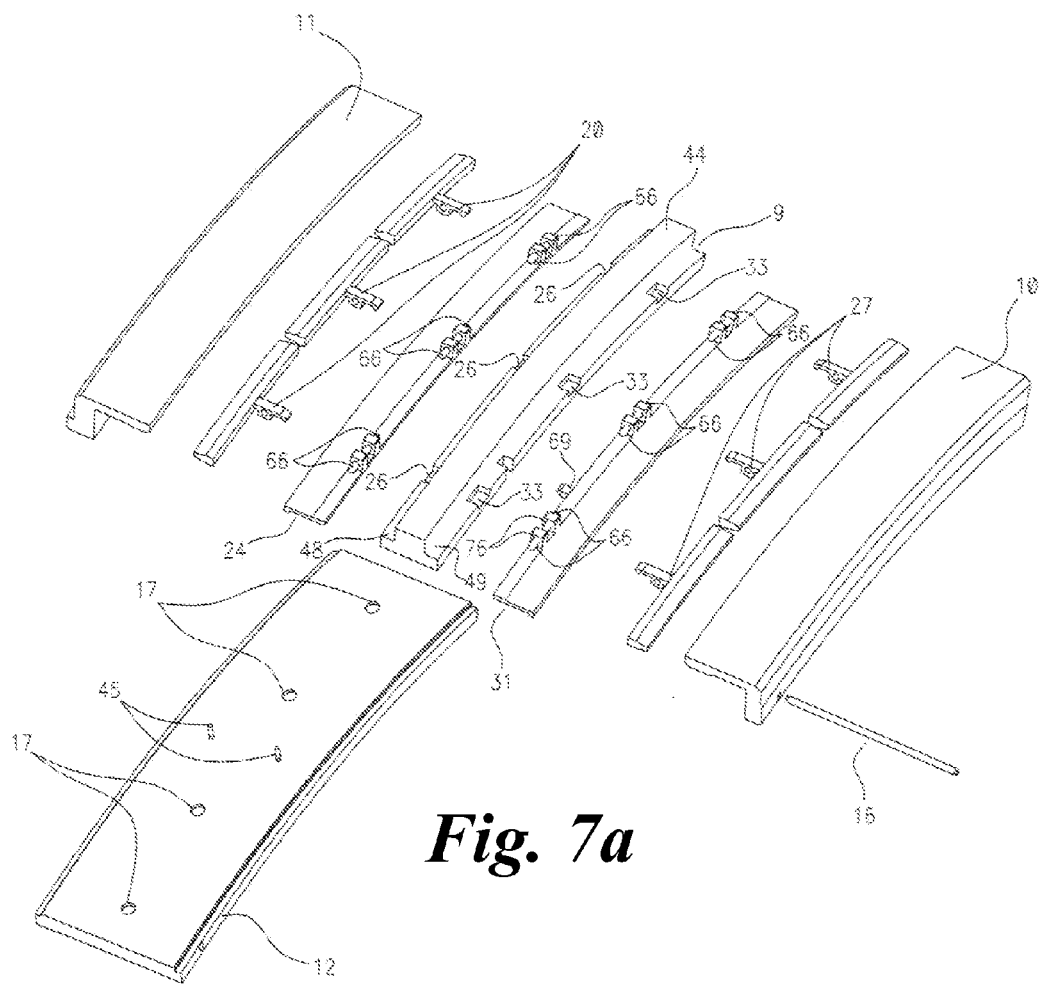
FIG. 7a is an exploded view illustrating a seal assembly wherein a plurality of counterweights is disposed about an inverted generally T-shaped seal segment in accordance with an embodiment of the invention.
Figure 9:
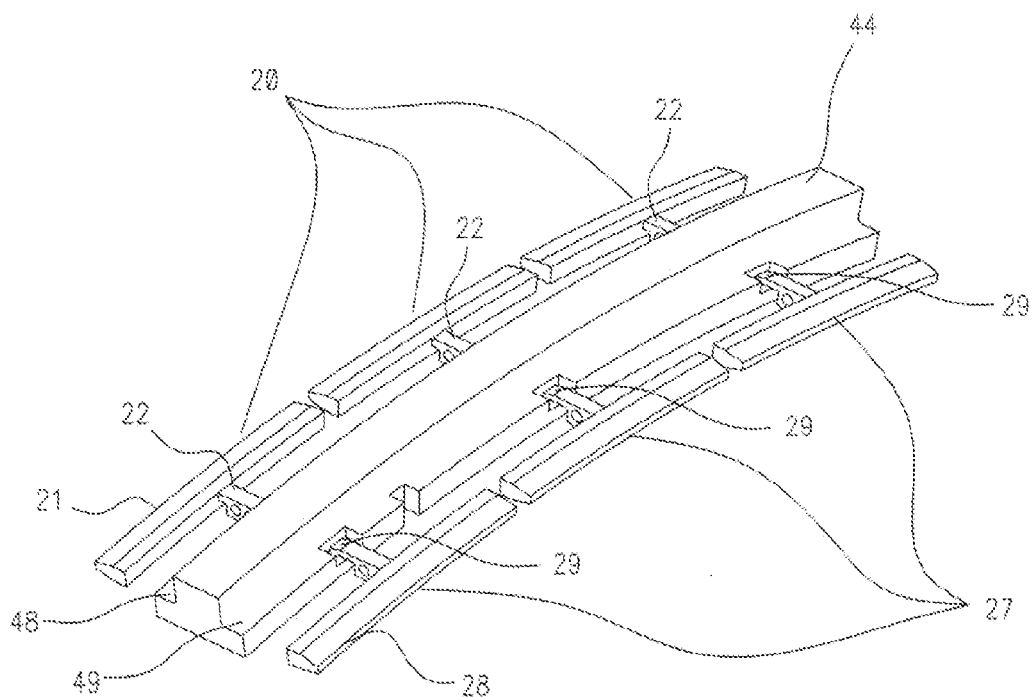
FIG. 9 is a perspective view illustrating contact between an inverted generally T-shaped seal segment and several counterweights in accordance with an embodiment of the invention.

An annular seal element 9 is partially disposed within the pocket formed by the annular end rings 10, 11 and annular spacer ring 12. The annular seal element 9 is composed of two or more arcuate seal segments 44. One exemplary seal segment 44 is shown in FIGS. 7a and 9. Seal segments 44 are assembled end-to-end about the annular spacer ring 12 to form a continuous ring-shaped structure. Abutting ends of the seal segments 44 could include flat surfaces, a tongue and a groove, or other non-overlapping or overlapping design feature(s) known within the art. In preferred embodiments, abutting ends of the seal segments 44 should overlap to minimize leakage through joints along the otherwise segmented annular seal element 9.

The annular seal element 9 has a "T" shaped cross section. The annular seal element 9 is inverted so that the center portion of the "T" shaped cross section is interposed between the ends 75 along the annular end rings 10, 11 and extends outward from the horizontal elements 74. The center portion of the annular seal element 9 has a generally rectangular cross section. A shoulder 48, 49 extends from each side of the rectangular center portion toward the inner diameter of the annular seal element 9 within the pocket formed by the annular end rings 10, 11 and annular spacer ring 12. The shoulders 48, 49 are flange-like elements which extend substantially perpendicular adjacent the inner radial end of the annular seal element 9 and are substantially parallel to the horizontal elements 74 and annular spacer ring 12. The shoulders 48, 49 are arranged to either side of the annular seal element 9 without contacting the horizontal elements 74 and annular spacer ring 12.

Figure 2:
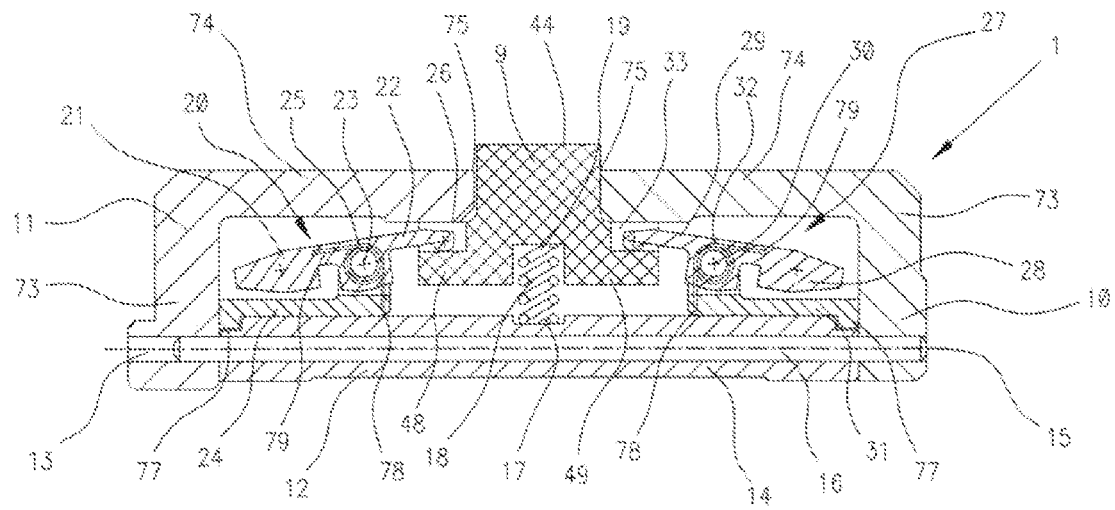
FIG. 2 is an enlarged cross-sectional view illustrating, before installation between inner and outer shafts (not shown), an inverted generally T-shaped seal element disposed between and contacting a pair of counterweights wherein the seal element is disposed between and extended from a pair of end rings in accordance with an embodiment of the invention.
Figure 3:
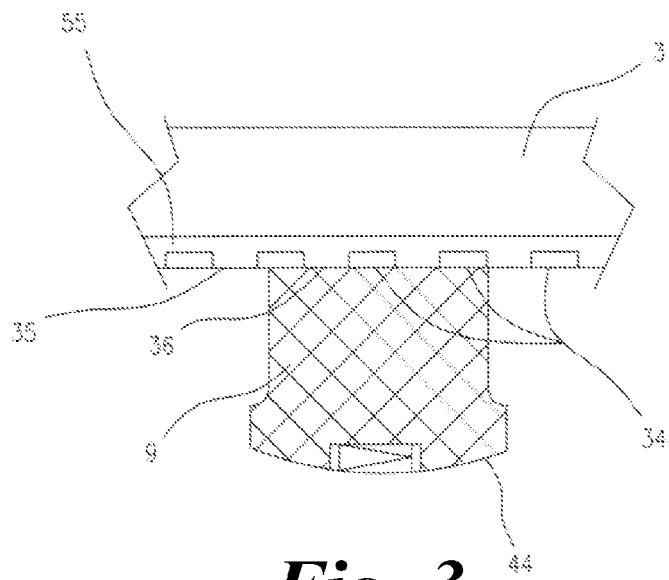
FIG. 3 is an enlarged cross-sectional view illustrating contact between an outer shaft with hydrodynamic grooves and an inverted generally T-shaped seal element when the seal element is disposed between inner and outer shafts (the former not shown) and otherwise extended.
Figure 11:
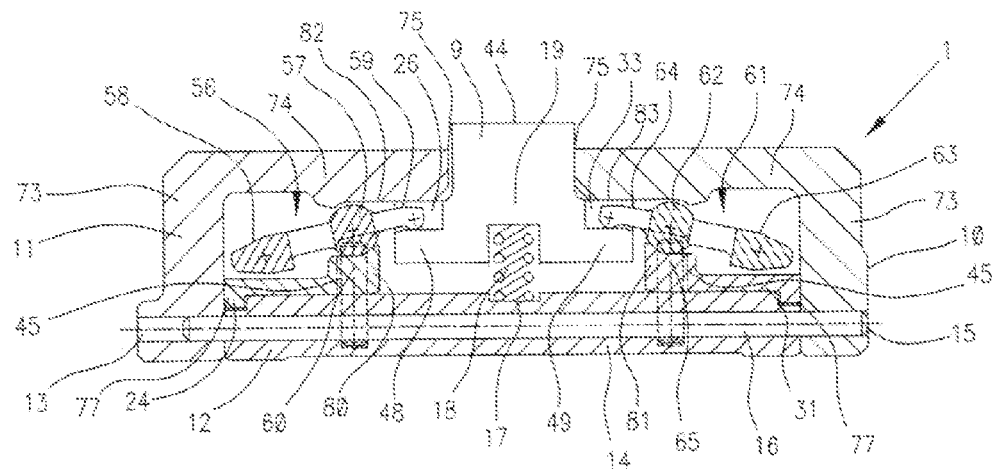
FIG. 11 is a an enlarged cross-sectional view illustrating, before installation between inner and outer shafts (not shown), an inverted generally T-shaped seal element disposed between and contacting a pair of counterweight rings wherein the seal element is disposed between and extended above a pair of end rings in accordance with an embodiment of the invention.
Figure 12:
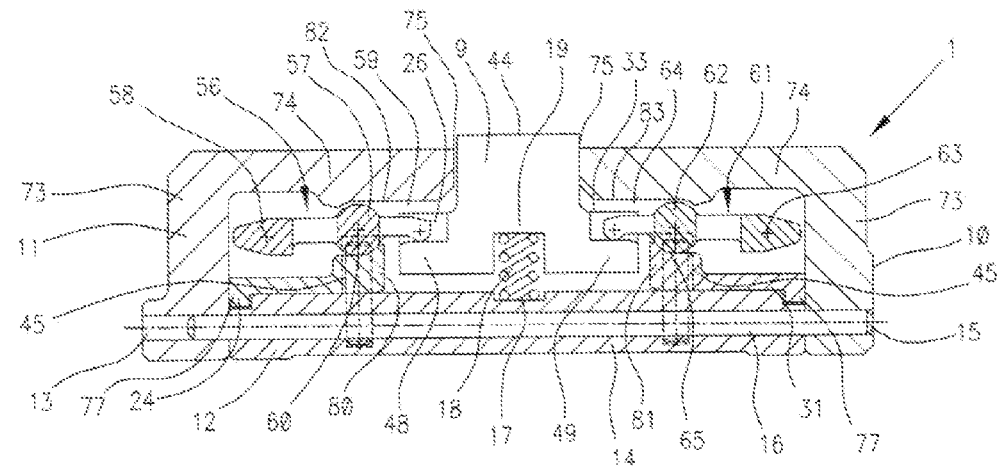
FIG. 12 is an enlarged cross-sectional view illustrating, after installation between inner and outer shafts (not shown), an inverted generally T-shaped seal element disposed between and contacting a pair of counterweight rings wherein the seal element is partially refracted between a pair of end rings in accordance with an embodiment of the invention.

The center portion of the annular seal element 9 is interposed between the ends 75 of the horizontal elements 74. The distance between the ends 75 should be greater than the width of the center portion of the annular seal element 9. This feature limits contact between the annular seal element 9 and annular end rings 10, 11 to no more than one end 75. The annular seal element 9 is interposed between the ends 75 so as to be radially extendible and retractable with respect to the annular end rings 10, 11 and thereby the seal assembly 1. In one example, FIGS. 2 and 3 show the annular seal element 9 extended from and retracted into the seal assembly 1, respectively. In another example, FIGS. 11 and 12 show the annular seal element 9 extended from and refracted into the seal assembly 1, respectively.

The annular seal element 9 is biased via at least one resilient element 18 toward the horizontal elements 74 in the direction of the outer shaft 3 and away from the annular spacer ring 12. In some embodiments, the resilient element 18 could be a wave spring or other circular-shaped element capable of communicating a force radially outward onto seal segments 44 comprising an annular seal element 9. The resilient element 18 is positioned within the radial gap between and contacts the annular seal element 9 and annular spacer ring 12. In other embodiments, at least one resilient element 18 could contact each seal segment 44 and the annular spacer ring 12. Each resilient element 18 could partially reside within a like-shaped recess 19 along the annular seal element 9 and a like-shaped recess 17 along the annular spacer ring 12. The recesses 17, 19 could be disposed in a pairwise arrangement about the circumference of the inner shaft 2. The resilient element 18 should be longer than the space, including recesses 17, 19, between the annular seal element 9 and annular spacer ring 12 so that the resilient element 18 is at least partially compressed when contacting the annular seal element 9 and annular spacer ring 12 so as to communicate a force radially outward onto the annular seal element 9.

Referring again to FIGS. 2 and 4, a carrier 24, 31 is shown disposed about the circumference of the annular spacer ring 12 and contacting the circumferential surface thereof. The carriers 24, 31 are disposed about the annular seal element 9 and separated therefrom. A plurality of counterweights 20, 27 is separately attached to the carriers 24, 31, respectively. Each counterweight 20, 27 is secured to the carrier 24, 31 via a pin 23, 30. Each counterweight 20, 27 includes a contact arm 22, 29 and a mass arm 21, 28. The contact arm 22, 29 extends along the counterweight 20, 27 away from the pin 23, 30 in the direction of the shoulder 48, 49. The end of the contact arm 22, 29 extends into a notch 26, 33 along the shoulder 48, 49 wherein the contact arm 22, 29 contacts the shoulder 48, 49. The mass arm 21, 28 extends along the counterweight 20, 27 away from the pin 23, 30 opposite of the contact arm 22, 29. Unlike the contact arm 22, 29, the mass arm 21, 28 is not required to contact other components within the seal assembly 1. The mass arm 21, 28 is heavier than the contact 22, 29. The counterweight 20, 27 freely rotate about the pin 23, 30.

A spring 25, 32 could be secured to the counterweight 20, 27 via the pin 23, 30. The spring 25, 32 could be a coil spring with two arms 78, 79. The pin 23, 30 could pass through the coiled portion of the spring 25, 32 and thereby fix the spring 25, 32 to the respective counterweight 20, 27. One arm 78 could be fixed to the carrier 24, 31 and another arm 79 fixed to the counterweight 20, 27. The arms 78, 79 of the spring 25, 32 are arranged with respect to the coil to bias the contact arm 22, 29 toward the annular spacer ring 12 and the mass arm 21, 28 away from the annular spacer ring 12. The springs 25, 32 ensure contact between counter arms 22, 29 and shoulders 48, 49, thereby minimizing chatter therebetween. The forces applied by the springs 25, 32 could offset or negate a portion of the force applied by the resilient element(s) 18 onto each seal segment 44 along the annular seal element 9.

Referring now to FIG. 3, the annular seal element 9 is shown contacting an outer shaft 3 when one or more seal segments 44 are extended as represented in FIGS. 2 and 11. The outer shaft 3 includes a plurality of hydrodynamic grooves 34 disposed along the inner annular surface 35 thereof. The outer surface 36 of the annular seal element 9 contacts the inner annular surface 35 so as to least partially overlay at least some of the hydrodynamic grooves 34. In one aspect of the invention, the resilient element(s) 18 and springs 25, 32 allow for contact between the annular seal element 9 and outer shaft 3 at least below a threshold for onset of hydrodynamic effects by the hydrodynamic grooves 34. The resilient element(s) 18 should ensure the diameter of the outer surface 36 is larger than the diameter of the inner annular surface 35 before the seal assembly 1 is assembled between the inner and outer shafts 2, 3. This feature requires each seal segment 44 along the annular seal element 9 to be compressed radially inward when the seal assembly 1 is assembled into the gap or space between the inner and outer shafts 2, 3.

Figure 4:
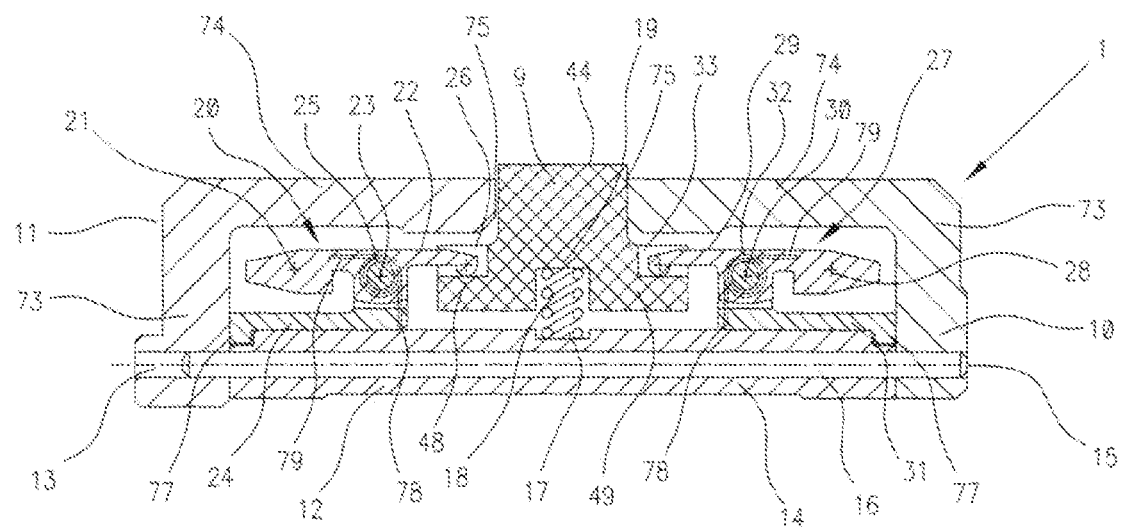
FIG. 4 is an enlarged cross-sectional view illustrating, after installation between inner and outer shafts (not shown), an inverted generally T-shaped seal element disposed between and contacting a pair of counterweights wherein the seal element is partially refracted between a pair of end rings in accordance with an embodiment of the invention.
Figure 5:
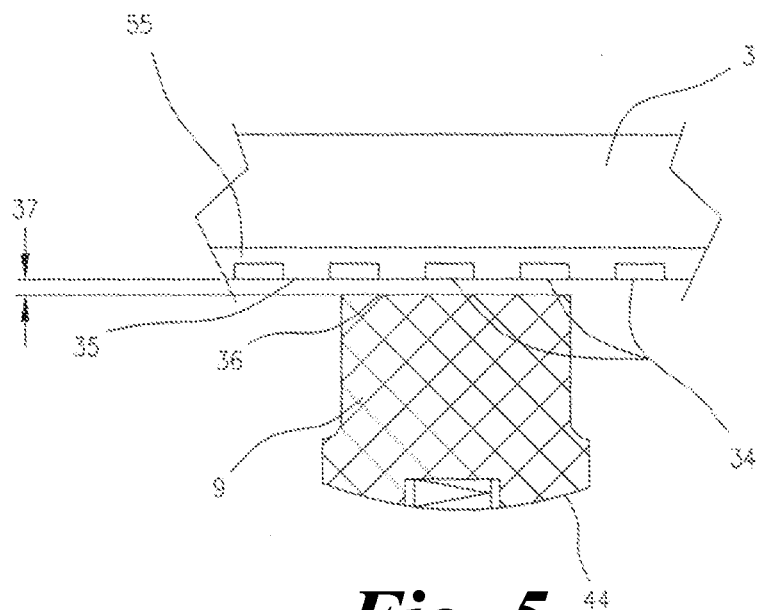
FIG. 5 is an enlarged cross-sectional view illustrating separation between an outer shaft with hydrodynamic grooves and an inverted generally T-shaped seal element when the seal element is disposed between inner and outer shafts (the former not shown) and otherwise extended to form an operational clearance.

Referring now to FIG. 5, the annular seal element 9 is shown separated from the outer shaft 3 when one or more seal segments 44 are retracted as illustrated in FIGS. 4 and 12. A thin-film layer 37 is interposed between the outer surface 36 along the seal segments 44 comprising the annular seal element 9 and the inner annular surface 35 along outer shaft 3 when the differential shaft speed between inner and outer shafts 2, 3 is sufficient for hydrodynamic effects. In some embodiments, the hydrodynamic grooves 34 are cut or otherwise formed into the inner annular surface 35 of the outer shaft 3. In other embodiments, the hydrodynamic grooves 34 are cut or otherwise formed into an insert 55. The insert 55 could be an annular-shaped ring of a wear resistant material, examples including but not limited to tungsten carbide or chromium carbide, deposited or otherwise applied via methods understood in the art into an annular groove along the inner annular surface 35 along the outer shaft 3. A plurality of hydrodynamic grooves 34 at least partially overlay the interface between the outer shaft 3 and the annular seal element 9 so as to communicate air onto the overlapping surfaces necessary for formation of the thin-film layer 37.

Figure 6:
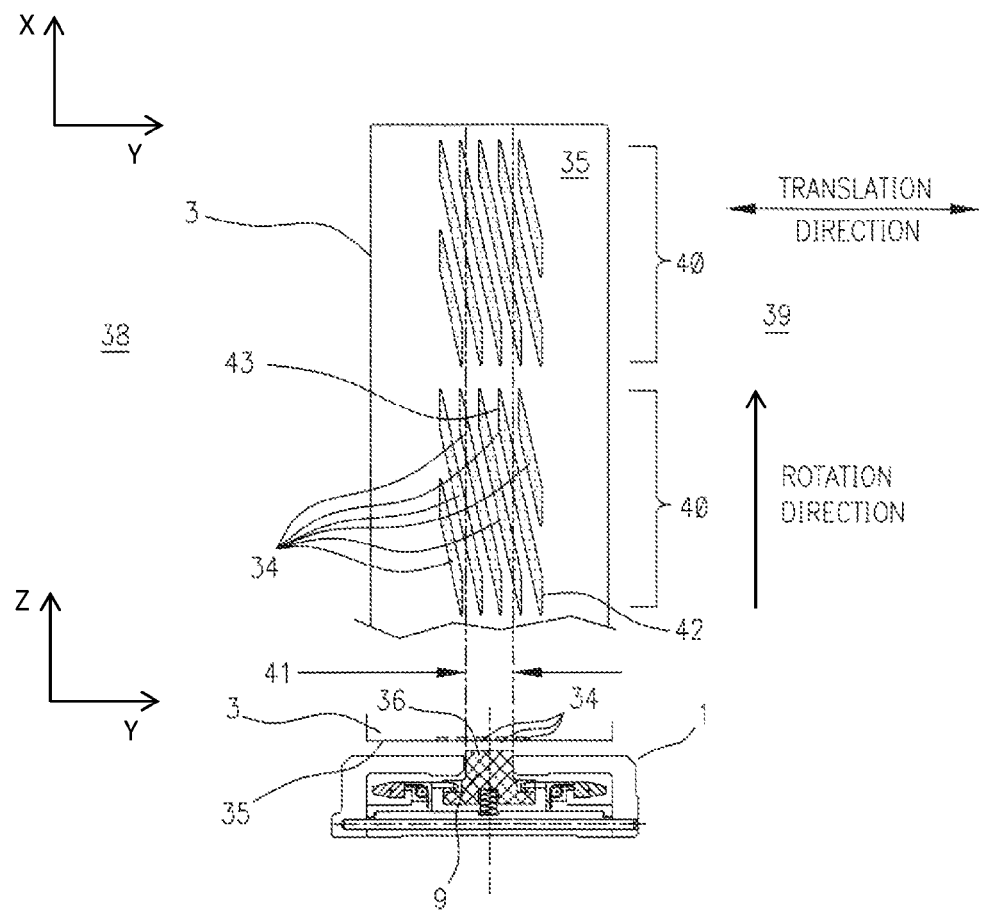
FIG. 6 is a cross-sectional view illustrating a seal assembly immediately adjacent to an outer shaft wherein the outer shaft includes a plurality of hydrodynamic grooves as further illustrated in a circumferential view of the inner diameter of the outer shaft above the cross-section view in accordance with an embodiment of the invention.

Referring now to FIG. 6, a plurality of hydrodynamic grooves 34 are shown disposed on the inner annular surface 35 along the outer shaft 3. Each hydrodynamic groove 34 is a pocket, depression, flute or recessed structure which allows air or another fluid to enter an inlet end 43 and exit an outlet end 42. The inlet end 43 of each hydrodynamic groove 34 is oriented toward the high pressure side 38. The outlet end 42 is oriented toward the low pressure side 39. The hydrodynamic grooves 34 are angled with respect to the rotational direction so as to ensure air enters the inlet ends 43 and traverses in length of the hydrodynamic grooves 34. Air pressure rises in each dead-ended hydrodynamic groove 34 that overlaps the annular seal element 9 within the overlay region 41. Pressurization does not occur within a hydrodynamic groove 34 when the outlet end 42 of the hydrodynamic groove 34 extends beyond the annular seal element 9. The staggered arrangement of diagonal grooves ensures that at least one outlet end 42 is positioned over the annular seal element 9 during axial translations between inner and outer shafts 2, 3. The orientation of and dynamic effects within the hydrodynamic grooves 34 ensure a fluid pressure at the outlet ends 42 greater than the inlet ends 43.

In some embodiments, it might be advantageous for the hydrodynamic grooves 34 to be disposed along the inner annular surface 35 so that at least some inlet ends 43 are positioned at different distances from the high pressure side 38 and some outlet ends 42 are positioned at different distances from the low pressure side 39. The annular seal element 9 is positioned along the outer shaft 3 so that at least some inlet ends 43 are outside the overlay region 41 between annular seal element 9 and outer shaft 3 and at least some outlet ends 42 are within the overlay region 41. This feature ensures proper communication of fluid into the interface between the annular seal element 9 and outer shaft 3 and formation of a thin-film layer 37 over a range of axial translations between the inner and outer shafts 2, 3.

In other embodiments, it might be advantageous for the hydrodynamic grooves 34 to be arranged in separate groove sets 40. Each groove set 40 could include at least two hydrodynamic grooves 34 with inlet ends 43 which are equidistant and/or non-equidistant from the low pressure side 39. It is likewise possible for at least two outlet ends 42 within each groove set 40 to be equidistant and/or non-equidistant from the low pressure side 39. The groove sets 40 could be arranged about the inner annular surface 35 of the outer shaft 3 to provide substantially repeating patterns to ensure a thin-film layer 37 between the outer shaft 3 and seal segments 44 along the annular seal element 9.

Figure 7B:
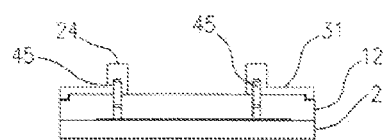
FIG. 7b is a cross-section view illustrating attachment of carriers to an inner shaft in accordance with an embodiment of the invention.

Referring now to FIGS. 7a and 7b, the annular spacer ring 12 is positioned about the inner shaft 2 so as to surround and contact the inner shaft 2. At least two pins 45 are inserted into like-sized holes aligned along the inner shaft 2 and annular spacer ring 12. The pins 45 could completely traverse the thickness of the annular spacer ring 12 so as to extend therefrom. Carriers 24, 31 are separately positioned along and contact the outer surface of the annular spacer ring 12. Carriers 24, 31 could be ring-shaped elements or assembled from two or more arcuate-shaped segments arranged end-to-end about the annular spacer ring 12. In some embodiments, each carrier 24, 31 could include a shoulder 77, as shown in FIGS. 2, 4, 11, and 12, which contacts a like-shaped structure along the side of the annular spacer ring 12 to properly align and seat the carrier 24, 31 onto the annular spacer ring 12. One pin 45 could secure each carrier 24, 31 to the annular spacer ring 12 so that the carriers 24, 31, annular spacer ring 12, and inner shaft 2 rotate together.

Seal segments 44 are interposed between the carriers 24, 31 about the annular spacer ring 12. The seal segments 44 could overlay recesses 17 along the annular spacer ring 12 for attachment of resilient elements 18 to each seal segment 44, as otherwise described in FIGS. 2, 4, 11, and 12. Each seal segment 44 could include at least one notch 26, 33 disposed along each shoulder 48, 49, respectively. Each carrier 24, 31 could include at least one pairwise arrangement of flanges 66. Each flange 66 could include a hole 76 positioned along the flange 66 to be mutually aligned. The pins 23, 30 described in FIGS. 2, 4, 11, and 12 secure the counterweights 20, 27 and springs 25, 32 to the flanges 66 so that the counterweights 20, 27 are rotatable with respect to the carriers 24, 31. An interference fit could be provided between each pin 23, 30 and holes 76. In other embodiments, a shouldered pin is installed and the opposite end riveted in place. A clearance fit could be provided between the pin 23, 30 and a hole 47 through the counterweights 20, 27, the latter shown in FIG. 8b, and the coil of the spring 25, 32 so that the counterweight 20, 27 is rotatable about the pin 23, 30.

A pair of flanges 66 is disposed about each notch 26, 33. This feature ensures proper alignment of the contact arms 22, 29 with the notches 26, 33 so that the contact arms 22, 29 properly engage the seal segment 44. The recessed placement of the contact arms 22, 29 within the notches 26, 33 also prevents relative rotation between the seal segments 44 and carriers 24, 31 within the seal assembly 1. The annular end rings 10, 11 are assembled onto the inner shaft 2 to either side of the annular spacer ring 12. An anti-rotation pin 16 secures the annular end rings 10, 11 as otherwise described in FIGS. 2, 4, 11, and 12.

Figure 8A:
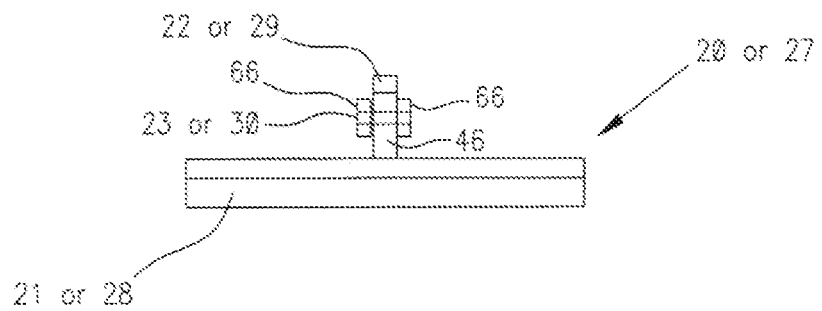
FIG. 8a is a top view illustrating a counterweight disposed about a pair of flanges along a carrier in accordance with an embodiment of the invention.
Figure 8B:
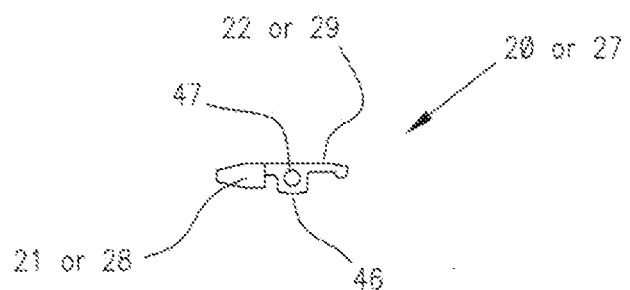
FIG. 8b is a side view illustrating a counterweight in accordance with an embodiment of the invention.
Figure 8C:
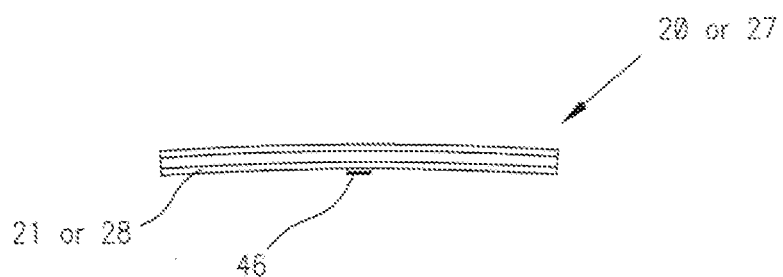
FIG. 8c is a face view illustrating curvature of a counterweight in accordance with an embodiment of the invention.

Referring now to FIGS. 8a-8c, one contact arm 22, 29 intersects and is attached to one mass arm 21, 28 to form the counterweight 20, 27. In preferred embodiments, the contact arm 22, 29 is substantially perpendicular with respect to the mass arm 21, 28. The mass arm 21, 28 is larger and substantially heavier than the contact arm 22, 29. The contact arm 22, 29 is slightly less wide than the distance between the flanges 66 along the carrier 24, 31 so as to allow the contact arm 22, 29 to freely rotate with respect to the flanges 66. A flange 46 intersects and is attached to the contact arm 22, 29 adjacent to the mass arm 21, 28. The flange 46 includes a hole 47 capable of receiving the pin 23, 30. The mechanical advantage of the counterweight 20, 27 is proportional to the ratio of the length of the mass arm 21, 28, from approximately its center of mass 53 to the center of the hole 47, over the length of the contact arm 22, 29, from approximately its end to the center of the hole 47.

Referring now to FIG. 9, three counterweights 20, 27 are shown along each side of one seal segment 44 of an annular seal element 9, although, it is understood that at least one counterweight 20, 27 is required along each side. The counterweights 20, 27 are preferred to be disposed about the seal segment 44 so that the contact arms 22, 29 contact the respective shoulders 48, 49 in a substantially symmetric arrangement. This feature ensures a balanced application of forces along the seal segment 44 thereby minimizing twist or other misalignments which could impede radial extension and retraction of the seal segment 44 between the annular end rings 10, 11. The contact arms 22, 29 and mass arms 21, 28 are counter functional. When the mass arms 21, 28 rotate outward, the contact arms 22, 29 rotate inward causing the seal segment 44 to retract into the seal assembly 1. The mass arms 21, 28 rotate outward when the inner shaft 2 rotates because the centrifugal forces acting on the mass arm 21, 28 exceed the centrifugal forces acting on the contact arms 22, 29. When the mass arms 21, 28 rotate inward, usually accompanying a reduction in rotation speed, the contact arms 22, 29 rotate outward causing the seal segment 44 to extend from the seal assembly 1.

Figure 10:
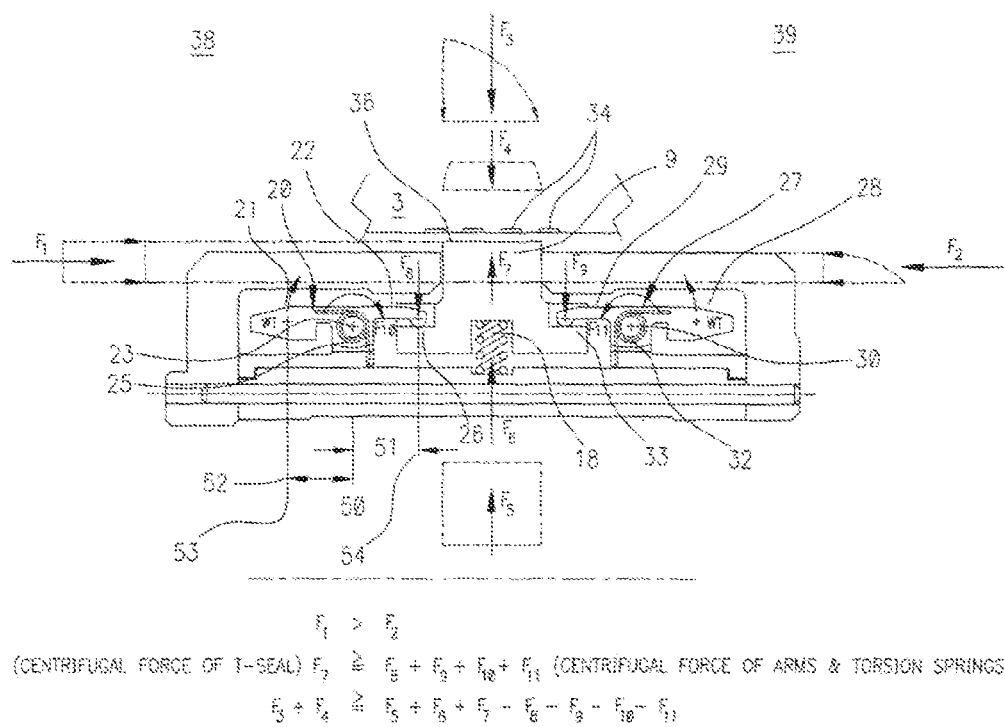
FIG. 10 is a cross-section view illustrating forces acting on an inverted generally T-shaped seal segment with multiple counterweights and torsion springs in accordance with an embodiment of the invention.

Referring now to FIG. 10 with further reference to FIGS. 2 and 4, the annular seal element 9 is subjected to both axial and radial forces. The forces shown in FIG. 10 and discussed herein are for descriptive purposes and not intended to limit the scope of the invention.

In the axial direction, the annular seal element 9 is subjected to forces $F_1$ and $F_2$. Force $F_1$ is imposed along the high pressure side 38 of the annular seal element 9 by high pressure gas over the area of the seal face and is directed toward the low pressure side 39. Force $F_2$ is imposed along the low pressure side of the annular seal element 9 by a radially outward breakdown in gas pressure over the area of the seal face and is directed toward the high pressure side 38. At steady conditions, Force $F_1$ is greater than Force $F_2$ causing the side of the annular seal element 9 to contact the annular end ring 10 adjacent to the low pressure side 39.

In the radial direction, the annular seal element 9 is subjected to at least nine forces. Force $F_3$ is imposed along the outer surface 36 of the annular seal element 9 by high pressure gas breaking down over the axial width of the seal and is directed radially inward toward the inner shaft 2. Force $F_4$ is imposed along the outer surface 36 of the annular seal element 9 by the hydrodynamic grooves 34 and is also directed radially inward toward the inner shaft 2. Force $F_5$ is imposed along the inner bore of the annular seal element 9 by gases from the high pressure side 38 acting on the annular seal element 9 radially outward toward the outer shaft 3. Force $F_6$ is imposed onto the inner bore of the annular seal element 9 by the resilient element(s) 18 and is also directed radially outward. Force $F_7$ is imposed by the annular seal element 9 and is associated with the outward centrifugal force due to the mass of the annular seal element 9.

Force $F_7$ is generally opposed by forces $F_8$, $F_9$, $F_{10}$, and $F_{11}$. Forces $F_{10}$ and $F_{11}$ are imposed by the springs 25, 32 which act on the counterweights 20, 27 to bias the contact arms 22, 29 inward on the shoulders 48, 49 toward the inner shaft 2. Forces $F_8$ and $F_9$ are directly imposed by the counterweights 20, 27 onto the respective shoulders 48, 49. Force $F_8$ is approximately equal to the outward centrifugal force imposed by the mass of the mass arm 21 at its center of mass 53 times the ratio of the mass arm length 52 divided by the contact arm length 51. The mass arm length 52 is approximately the distance from the center of mass 53 of the mass arm 21 to the pivot point 50. The contact arm length 51 is approximately equal to the distance from the contact point 54 between contact arm 22 and shoulder 48 to the pivot point 50. The pivot pin 50 coincides with the center of the pin 23 about which the counterweight 20 rotates. Force $F_9$ is also approximately equal to the outward centrifugal force imposed by the mass of the mass arm 28 at its center of mass 53 times the ratio of the mass arm length 52 divided by the contact arm length 51. The mass arm length 52 is approximately the distance from the center of mass 53 of the mass arm 28 to the pivot point 50. The contact arm length 51 is approximately equal to the distance from the contact point 54 between contact arm 29 and shoulder 49 to the pivot point 50. The pivot pin 50 coincides with the center of the pin 30 about which the counterweight 27 rotates. If the seal assembly 1 is properly balanced, then force $F_7$ is approximately equal to the sum of forces $F_8$ through $F_{11}$, thus negating the outward centrifugal force imposed by the annular seal element 9. The outer shaft 3 and annular seal element 9 separate when the combination of forces $F_3$ and $F_4$ are at least as great as the combination of forces $F_5$ and $F_6$.

Referring now to FIGS. 11 and 12, a pair of counterweights 56, 61 is shown disposed about the annular seal element 9. Each counterweight 56, 61 has an arcuate member 57, 62 interposed between and attached to a contact arm 59, 64 and a mass arm 58, 63. The contact arm 59, 64 is generally aligned with the mass arm 58, 63 about the arcuate member 57, 62. The contact arm 59, 64 extends toward the annular seal element 9 and into a notch 26, 33 therein so as to contact the shoulder 48, 49, as similarly described in FIGS. 2 and 4. The mass arm 58, 63 rotates within a pocket between the annular spacer ring 12 and the respective annular end ring 11, 10. The arcuate member 57, 62 contacts a flange 80, 81. The flange 80, 81 includes a socket 60, 65 which provides a complementary fit with the generally circular cross section of the arcuate member 57, 62. One end of each pin 45 is partially recessed within the annular spacer ring 12 and extends outward through the flange 80, 81 along each carrier 24, 31. A second end of each pin 45 could be partially recessed within a like-shaped recess along the arcuate member 57, 62. This feature could secure the arcuate member 57, 62 to the carrier 24, 31. The arcuate member 57, 62 should be rotatable within the socket 60, 65 with respect to the flange 80, 81.

Figure 13:
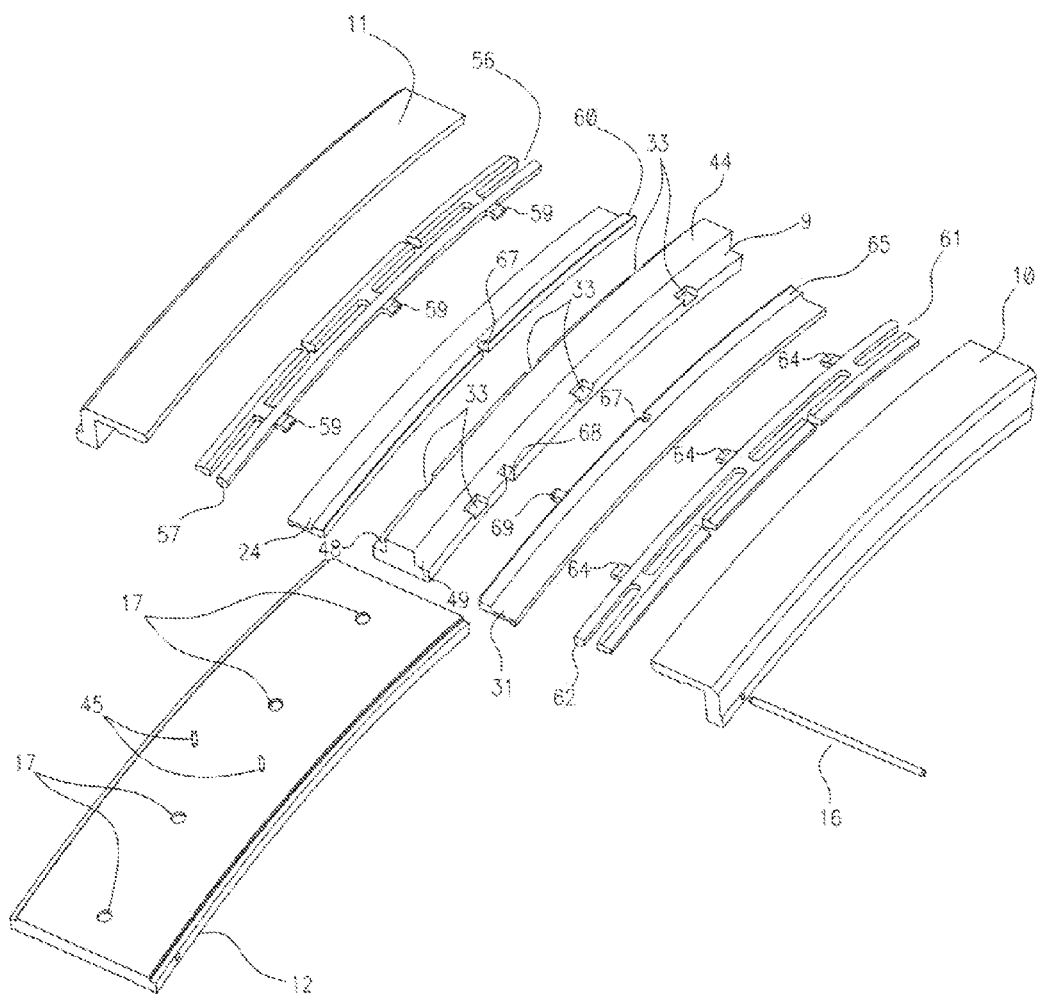
FIG. 13 is an exploded view illustrating a seal assembly wherein a pair of counterweights is disposed about an inverted generally T-shaped seal segment in accordance with an embodiment of the invention.

Referring now to FIG. 13 with further reference to FIGS. 11 and 12, the annular spacer ring 12 is shown with the pins 45 and recesses 17 as described herein. The seal segments 44 are assembled about the annular spacer ring 12 so that the recesses 17 align with recesses 19 along the inside surface of the seal segments 44. A resilient element 18 is received into each paired arrangement of recesses 17, 19 as otherwise described herein. In other embodiments, it is also possible for a single resilient element 18 to be interposed between the seal segments 44 and annular spacer ring 12, as also described herein.

The seal segment 44 includes at least one slot 68 through the shoulder 49. The slot 68 is aligned with and receives a tongue 69 which extends from an inside edge of the carrier 24, 31. This feature mechanically locks the seal segment 44 between the carriers 24, 31 to prevent relative rotational motion without restricting radial movement of the seal segment 44.

The counterweights 56, 61 are assembled onto the respective carriers 24, 31 so that the arcuate member 57, 62 contacts the respective socket 60, 65. The contact arms 59, 64 align with and are received by the notches 26, 33 disposed along the respective shoulder 48, 49 so as to directly contact the shoulder 48, 49.

Each carrier 24, 31 could include a groove 67 which receives the pin 45 as otherwise described in FIGS. 11 and 12. The pin 45 could partially penetrate the arcuate member 57, 62 so as to secure the arcuate member 57, 62 to the respective carrier 24, 31. However, the engagement between pin 45 and arcuate member 57, 62 should allow the arcuate member 57, 62 to rotate within the respective to the socket 60, 65.

The annular end rings 10, 11 are placed about and secured to the annular spacer ring 12 as otherwise described herein. The inner surface 82, 83 of the annular end ring 11, 10 should nearly contact the upper side of the arcuate member 57, 62 opposite the respective socket 60, 65, as represented in FIGS. 11 and 12. This feature further secures the arcuate member 57, 62 to the socket 60, 65 without binding or fixing the arcuate member 57, 62 to the carrier 24, 31 or annular end ring 10, 11.

Figure 14A:
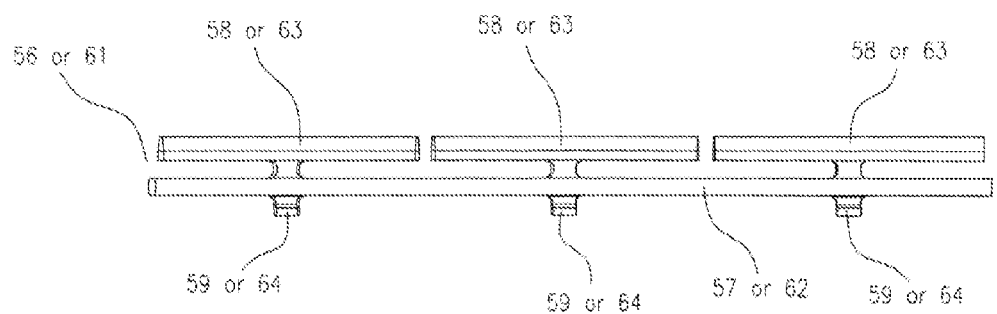
FIG. 14a is a top view illustrating a counterweight in accordance with an embodiment of the invention.
Figure 14B:
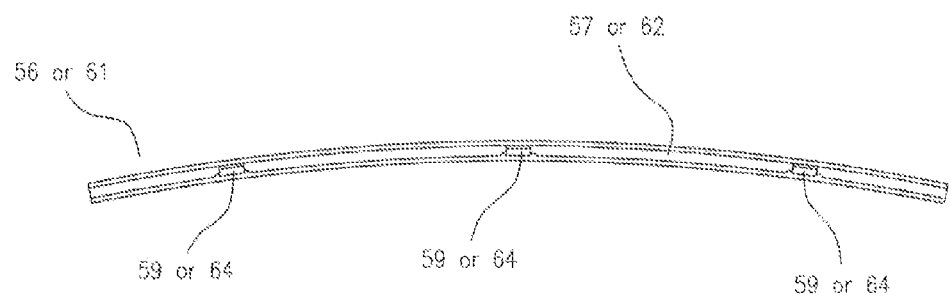
FIG. 14b is a face view illustrating a counterweight in accordance with an embodiment of the invention.

Referring now to FIGS. 14a and 14b, the counterweights 56, 61 are shown including a single arcuate member 57, 62 interposed between and attached to several contact arms 59, 64 and mass arms 58, 63. The arcuate member 57, 62 is generally curved, preferably with a curvature that allows for placement between the annular spacer ring 12 and respective annular end ring 10, 11. In some embodiments, two or more arcuate member 57, 62 could be arranged end-to-end about and contact the respective carrier 24, 31 thereby completely circumscribing the inner shaft 2. In other embodiments, the arcuate member 57, 62 could be a ring-shaped element that completely surrounds the respective carrier 24, 31 and contacts the respective socket 60, 65. Two or more mass arms 58, 63 and two or more contacts arms 59, 64 are positioned along the arcuate member 57, 62 in a pairwise arrangement. In some embodiments, the respective mass arms 58, 63, contact arms 59, 64, and arcuate members 57, 62 could be manufactured as a single unit from bar or plate stock to form the counterweight 56, 61. In other embodiments, the respective mass arms 58, 63, contact arms 59, 64, and arcuate members 57, 62 could be separately machined to shape and then welded or otherwise joined to form the counterweight 56, 61. The counterweights 56, 61 could be composed of a temperature resistant and resilient metal, non-limiting examples being steel, tungsten, or aluminum.

Orientation of the contact arm 59, 64 and mass arm 58, 63 with respect to the arcuate member 57, 62 is design dependent. In one example, each counterweight 56, 61 could be manufactured so that each contact arm 59, 64 and mass arm 58, 63 are disposed at an angle as represented in FIG. 11. The outwardly biased contact arms 59, 64 would not offset or negate the outward bias of the resilient element(s) 18. However, the mass arm 58, 63 would rotate outward as the inner shaft 2 rotates so that the contact arms 59, 64 press inward on the annular seal element 9 thereby retracting the annular seal element 9 into the seal assembly 1. In another example, each counterweight 56, 61 could be manufactured so that the contact arm 59, 64 and mass arm 58, 63 are disposed substantially parallel to the annular spacer ring 12 as represented in FIG. 12. The inwardly biased contact arms 59, 64 could offset or negate a portion of the outward bias of the resilient element(s) 18 so that the counterweights 56, 61 are at least slightly rotated at an angled before rotation of the inner shaft 2, as represented in FIG. 11. The inward bias of the contact arms 59, 64 could assist the inward motion of the contact arms 59, 64 resulting from the outward rotation of the mass arms 58, 63 during rotation of the inner shaft 2, thereby retracting the annular seal element 9 into the seal assembly 1.

Figure 15:
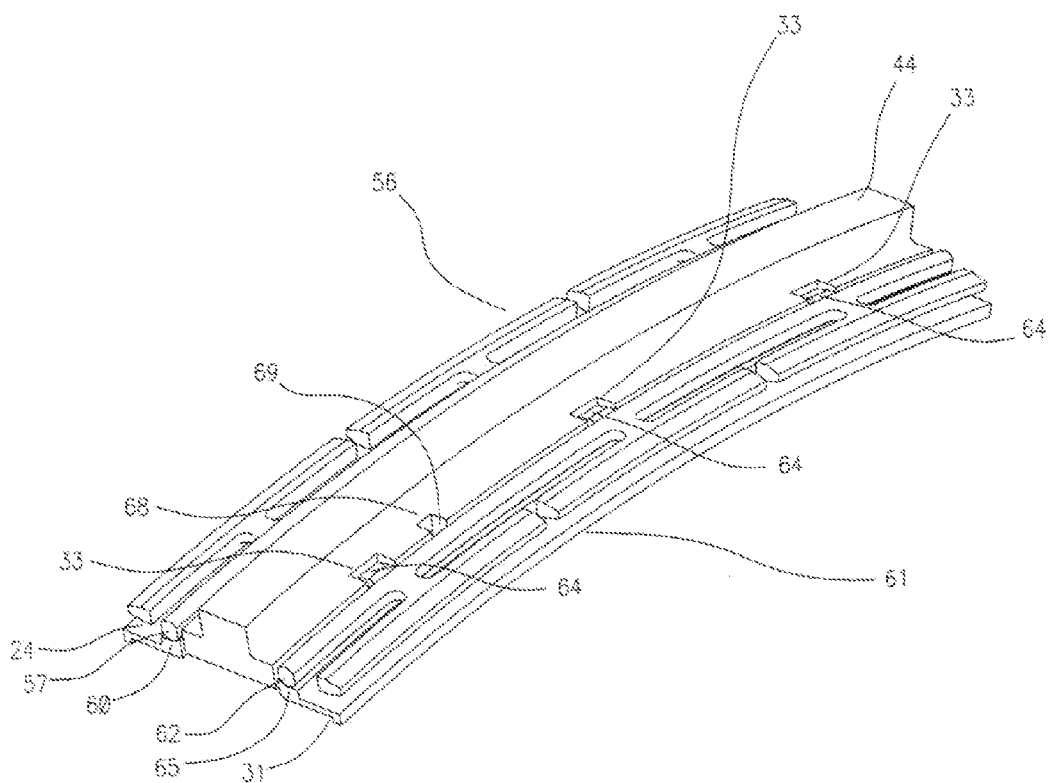
FIG. 15 is a perspective view illustrating contact between an inverted generally T-shaped seal segment and a pair of counterweights in accordance with an embodiment of the invention.

Referring now to FIG. 15 with further reference to FIGS. 11 and 12, the arcuate member 57, 62 is seated on the socket 60, 65 along the carrier 24, 31. The arcuate member 57, 62 rotates and flexes within the socket 60, 65. The contact arms 59, 64 and mass arms 58, 63 are counter functional. When the mass arms 58, 63 rotate outward, the contact arms 59, 64 rotate inward causing the seal segment 44 to retract into the seal assembly 1. The mass arms 58, 63 rotate outward when the inner shaft 2 rotates because the centrifugal forces acting on the mass arm 58, 63 exceed the centrifugal forces acting on the contact arms 22, 29. When the mass arms 58, 63 rotate inward usually accompanying a reduction in rotational speed, the contact arms 59, 64 rotate outward causing the seal segment 44 to extend from the seal assembly 1.

In some embodiments, functionality of an actuated mass arm 58, 63 along a single arcuate member 57, 62 could be isolated from other mass arms 58, 63. For example, rotation of one mass arm 58, 63 could locally twist or rotate the arcuate member 57, 62 immediately adjacent to the actuated mass arm 58, 63 when the arcuate member 57, 62 is more bendable or less rigid.

Figure 16:
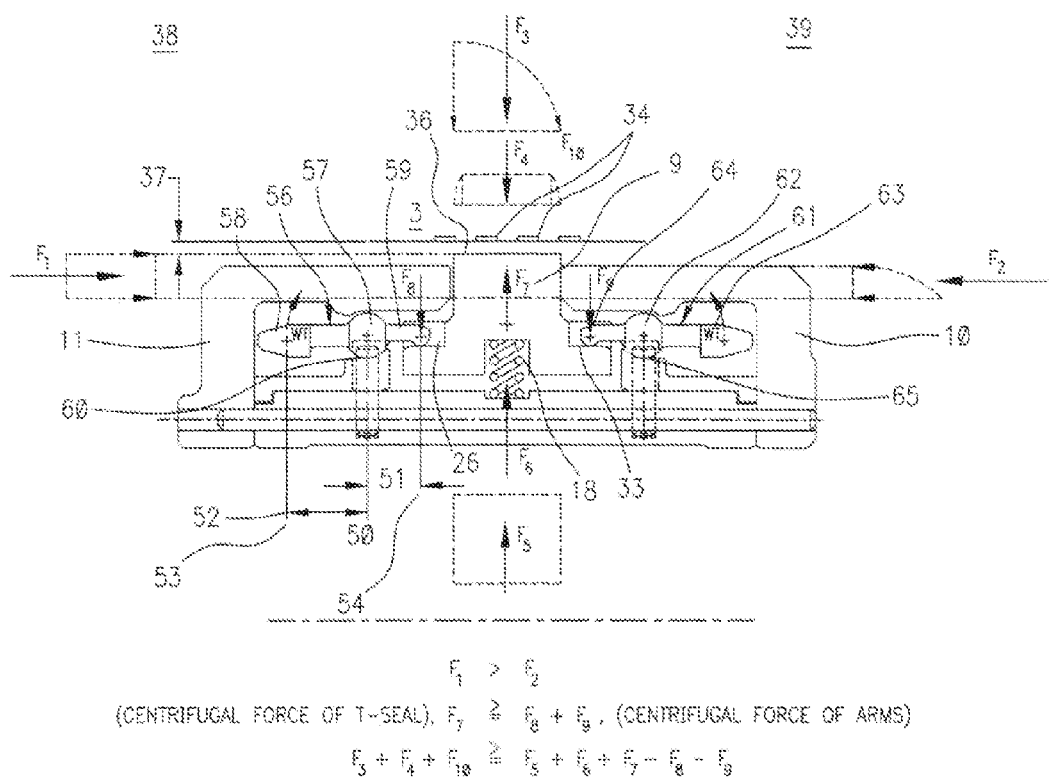
FIG. 16 is a cross-section view illustrating forces acting on an inverted generally T-shaped seal segment in accordance with an embodiment of the invention.
Figure 17:
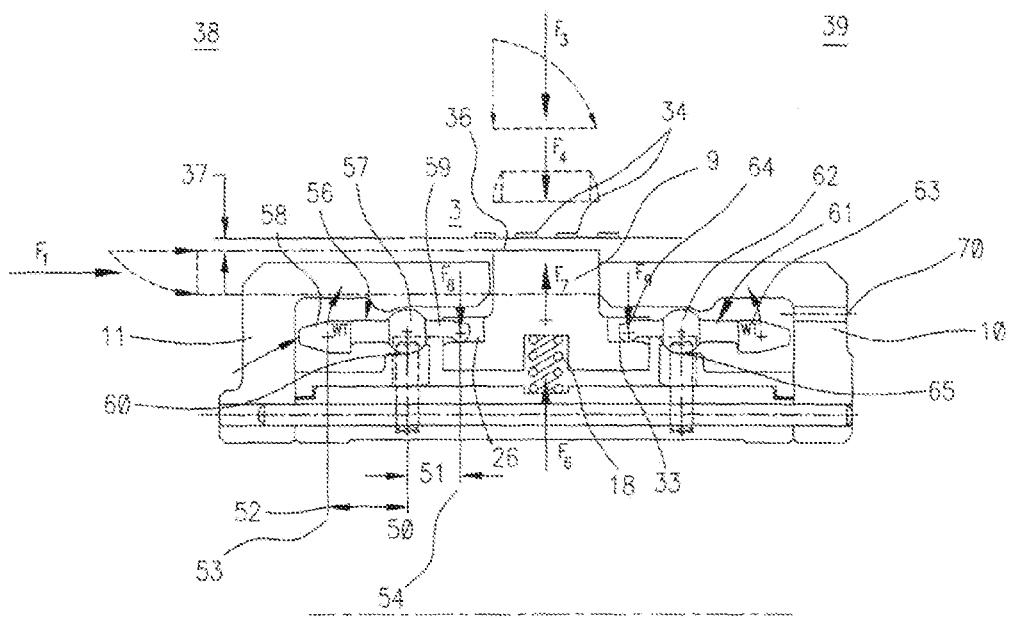
FIG. 17 is a cross-section view illustrating forces acting on an inverted generally T-shaped seal segment wherein one end ring includes an optional vent hole adjacent to the low pressure side in accordance with an embodiment of the invention.
Figure 18:
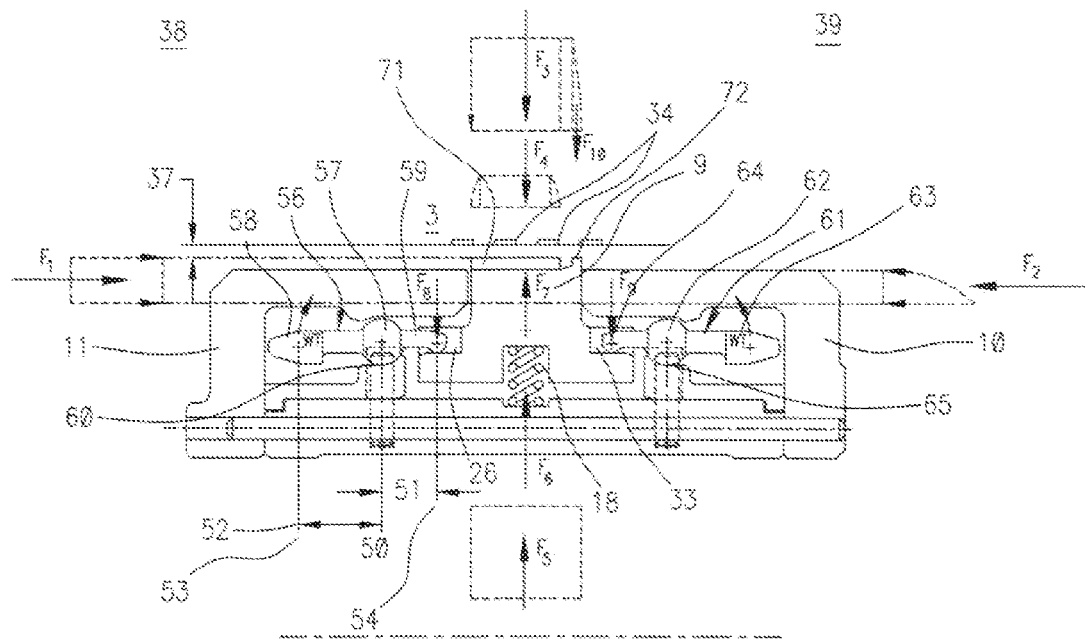
FIG. 18 is a cross-section view illustrating forces acting on an inverted generally T-shaped seal segment wherein the seal segment includes an optional groove and dam on the outer diameter thereof in accordance with an embodiment of the invention.

Referring now to FIGS. 16-18 with further reference to FIGS. 11 and 12, the annular seal element 9 is subjected to both axial and radial forces. The forces shown in FIGS. 16-18 and discussed herein are for descriptive purposes and not intended to limit the scope of the invention.

In the axial direction, the annular seal element 9 is subjected to forces $F_1$ and $F_2$. Force $F_1$ is imposed along the high pressure side 38 of the annular seal element 9 by high pressure gas over the area of the seal face and is directed toward the low pressure side 39. Force $F_2$ is imposed along the low pressure side of the annular seal element 9 by a radially outward breakdown in gas pressure over the area of the seal face and is directed toward the high pressure side 38. At steady conditions, Force $F_1$ is greater than Force $F_2$ causing the side of the annular seal element 9 to contact the annular end ring 10 adjacent to the low pressure side 39.

In the radial direction, the annular seal element 9 is subjected to at least seven forces. Force $F_3$ is imposed along the outer surface 36 of the annular seal element 9 by high pressure gas breaking down over the axial width of the seal and is directed radially inward toward the inner shaft 2. Force $F_4$ is imposed by the hydrodynamic grooves 34 on the outer surface 36 of the annular seal element 9 and is also directed radially inward toward the inner shaft 2. Force $F_5$ is imposed by gases within the high pressure side 38 acting on the inner bore of the annular seal element 9 and directed radially outward toward the outer shaft 3. Force $F_6$ is imposed by the resilient element(s) 18 onto the inner bore of the annular seal element 9 and is also directed radially outward. Force $F_7$ is imposed by annular seal element 9 and is associated with the outward centrifugal force due to the mass of the annular seal element 9.

Force $F_7$ is generally opposed by forces $F_8$ and $F_9$. Forces $F_8$ and $F_9$ are directly imposed by the counterweights 56, 61 onto the respective shoulders 48, 49. Force $F_8$ is approximately equal to the outward centrifugal force imposed by the mass of the mass arm 58 at its center of mass 53 times the ratio of the mass arm length 52 divided by the contact arm length 51. The mass arm length 52 is approximately the distance from the center of mass 53 of the mass arm 58 to the pivot point 50. The contact arm length 51 is approximately equal to the distance from the contact point 54 between contact arm 59 and shoulder 48 to the pivot point 50. The pivot pin 50 coincides with the center of the arcuate member 57 about which the counterweight 56 rotates. Force $F_9$ is also approximately equal to the outward centrifugal force imposed by the mass of the mass arm 63 at its center of mass 53 times the ratio of the mass arm length 52 divided by the contact arm length 51. The mass arm length 52 is approximately the distance from the center of mass 53 of the mass arm 63 to the pivot point 50. The contact arm length 51 is approximately equal to the distance from the contact point 54 between contact arm 64 and shoulder 49 to the pivot point 50. The pivot pin 50 coincides with the center of the arcuate member 62 about which the counterweight 61 rotates. If the seal assembly 1 in FIG. 16 is properly balanced, then force $F_7$ is approximately equal to the sum of forces $F_8$ through $F_9$, thus negating the outward centrifugal force imposed by the annular seal element 9. The outer shaft 3 and annular seal element 9 separate when the combination of forces $F_3$ and $F_4$ are at least as great as the combination of forces $F_5$ and $F_6$.

Referring now to FIG. 17 with further reference to FIG. 16, the annular end ring 10 is shown with an optional vent hole 70 adjacent to the low pressure side 39. The vent hole 70 is positioned along the annular end ring 10 to allow gas within the seal assembly 1 to pass into the low pressure side 39. Although the vent hole 70 is shown with specific reference to the seal assembly 1 in FIGS. 11 and 12, it is understood that the vent hole 70 is likewise applicable to other seal assemblies 1 described herein.

Gas within the seal assembly 1 from the high pressure side 38 impose force $F_5$ along inner bore of the annular seal element 9 radially outward toward the outer shaft 3. The vent hole 70 eliminates force $F_5$ from the force balance equation. If the seal assembly 1 in FIG. 17 is properly balanced, then the outer shaft 3 and annular seal element 9 separate when the combination of forces $F_3$ and $F_4$ are at least as great as force $F_6$.

Referring now to FIG. 18 with further reference to FIG. 16, the annular seal element 9 is shown with an optional groove 71 and optional dam 72. The groove 71 is disposed along a portion of the outer surface 36 of each seal segment 44 immediately adjacent to the outer shaft 3. The groove 71 circumscribes the annular seal element 9 and could include at least one inlet which directly communicates with the high pressure side 38. A dam 72 also circumscribes the outer surface 36 immediately adjacent to the low pressure side 39. The dam 72 restricts gases from the high pressure side 38 and within the groove 71 from reaching the low pressure side 39. Although the groove 71 and dam 72 are shown with specific reference to the seal assembly 1 in FIGS. 11 and 12, it is understood that both features are likewise applicable to other seal assemblies 1 described herein.

Gas from the high pressure side 38 acts on the outer surface 36 imparting an additional force $F_{10}$ directed radially inward toward the inner shaft 2. If the seal assembly 1 in FIG. 18 is properly balanced, then the outer shaft 3 and annular seal element 9 separate when the combination of forces $F_3$, $F_4$, and $F_{10}$ are at least as great as the combination of forces $F_5$ and $F_6$.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. An intershaft seal assembly interposed between an inner shaft and an outer shaft about a common axis within a turbine engine so as to separate a low pressure side from a high pressure side comprising:
    (a) a pair of annular end rings disposed about and directly contacts said inner shaft;
    (b) an annular seal element formed by at least two seal segments, each said seal segment has an inverted "T"-shaped cross section, said seal segments disposed between said annular end rings so that a portion of said inverted "T"-shaped cross section extends above said annular end rings in direction of said outer shaft, each said seal segment includes a pair of shoulders which extend from said seal segment between said annular end rings and said inner shaft;
    (c) at least one resilient element which biases said seal segments away from said inner shaft toward said outer shaft;
    (d) an annular spacer ring disposed about and directly contacts said inner shaft, said annular spacer ring disposed between and attached to said annular end rings, said annular seal element disposed about said annular spacer ring;
    (e) a pair of carriers disposed between said annular end rings about said annular seal element, said carriers directly contact said annular spacer ring;
    (f) at least two counterweights oppositely disposed about said seal segments, each said counterweight attached to one said carrier and contacts one said shoulder, said counterweights substantially negate forces acting on said seal segments outward toward said outer shaft; and
    (g) a plurality of hydrodynamic grooves disposed along an inner annular surface of said outer shaft, said hydrodynamic grooves direct fluid onto an outer surface along each said seal segment when said outer shaft rotates, said fluid forms a thin-film layer which separates said seal segments from said outer shaft.

2. The intershaft seal assembly of claim 1, wherein each said counterweight includes a mass arm and a contact arm oppositely disposed about a flange, said contact arm contacts one said shoulder, said mass arm rotatably responsive to rotation of said inner shaft, said counterweight rotates about said flange.

3. The intershaft seal assembly of claim 2, wherein said hydrodynamic grooves are arranged so that at least one said hydrodynamic groove communicates fluid onto said outer surface of each said seal segment.

4. The intershaft seal assembly of claim 2, wherein said inner annular surface along said outer shaft includes an insert comprised of a wear resistant material, said hydrodynamic grooves disposed along said wear resistant insert, said outer surface of said seal segments contacts said insert absent said thin-film layer.

5. The intershaft seal assembly of claim 2, wherein said hydrodynamic grooves are disposed along each said seal segment to form at least two groups, each said group includes at least two said hydrodynamic grooves.

6. The intershaft seal assembly of claim 2, wherein each said counterweight directly contacts a spring which biases said contact arm away from said outer shaft.

7. The intershaft seal assembly of claim 2, wherein each said shoulder includes at least one notch, one said contact arm disposed within each said notch.

8. The intershaft seal assembly of claim 2, wherein one said annular end ring includes at least one vent hole adjacent to said low pressure side.

9. The intershaft seal assembly of claim 2, wherein each seal segment includes a groove and a dam disposed along said outer surface, said dam adjacent to said low pressure side.

10. The intershaft seal assembly of claim 1, wherein each said counterweight includes at least two mass arms and at least two contact arms oppositely disposed about and attached to an arcuate member, said arcuate member directly contacts a socket along said carrier so as to be rotatable within said socket, said contact arms directly contact at least one said seal segment, said mass arms rotatably responsive to rotation of said inner shaft.

11. The intershaft seal assembly of claim 10, wherein said hydrodynamic grooves are arranged so that at least one said hydrodynamic groove communicates fluid onto said outer surface of each said seal segment.

12. The intershaft seal assembly of claim 10, wherein said inner annular surface along said outer shaft includes an insert comprised of a wear resistant material, said hydrodynamic grooves disposed along said wear resistant insert, said outer surface of said seal segments contacts said insert absent said thin-film layer.

13. The intershaft seal assembly of claim 10, wherein said hydrodynamic grooves are disposed along each said seal segment to form at least two groups, each said group includes at least two said hydrodynamic grooves.

14. The intershaft seal assembly of claim 10, wherein each said counterweight biases said contact arm away from said outer shaft.

15. The intershaft seal assembly of claim 10, wherein each said shoulder includes at least two notches, one said contact arm disposed within each said notch.

16. The intershaft seal assembly of claim 10, wherein one said annular end ring includes at least one vent hole adjacent to said low pressure side.

17. The intershaft seal assembly of claim 10, wherein each seal segment includes a groove and a dam disposed along said outer surface, said dam adjacent to said low pressure side.

* * * * *